Aug. 28, 1962  F. H. BUSCH ETAL  3,051,813
TEMPERATURE CONTROL SYSTEMS
Filed Aug. 24, 1960  5 Sheets-Sheet 1
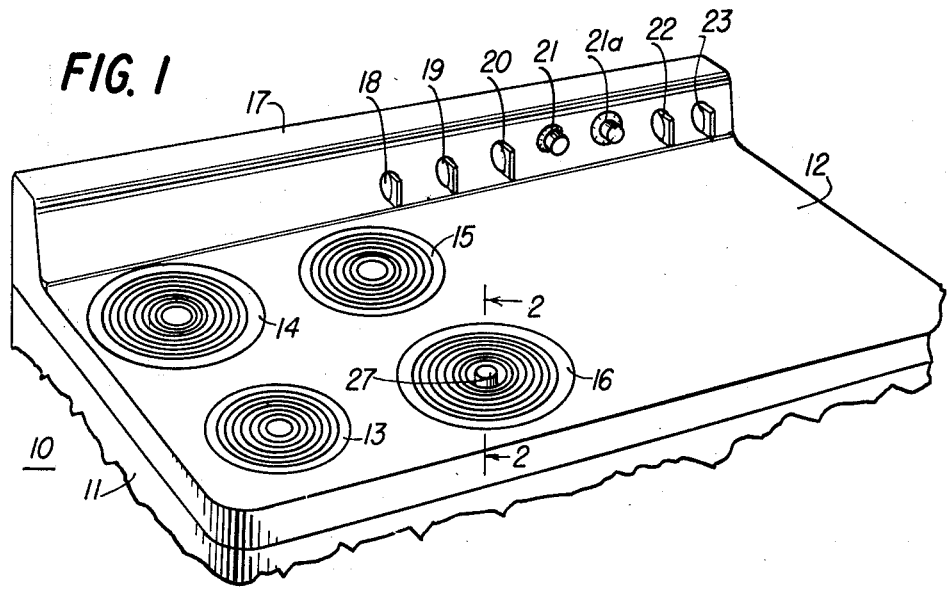
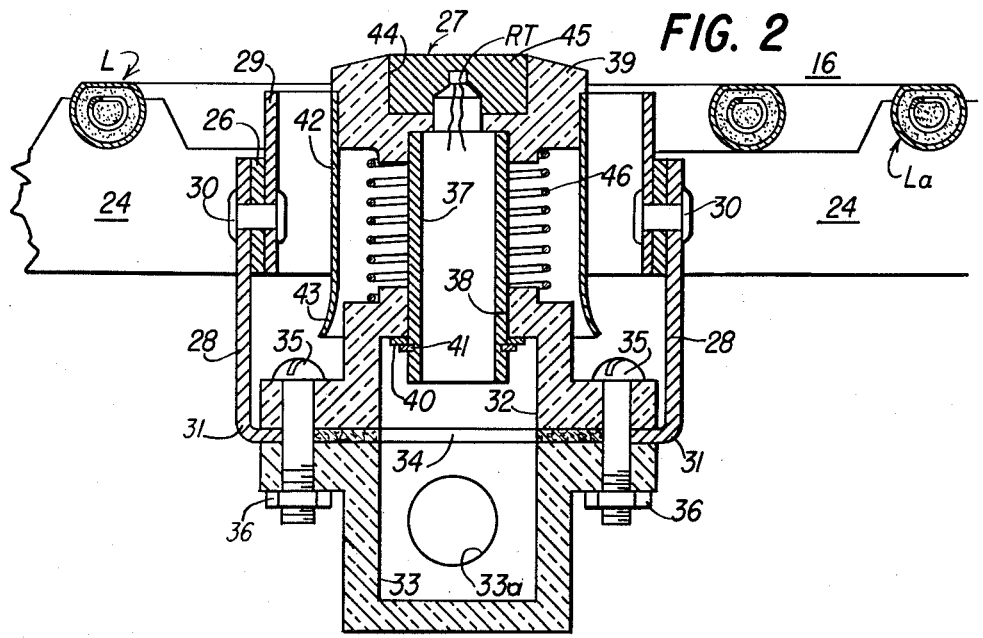
INVENTORS
Floyd H. Busch
Fred H. Sawada
BY
Prangley, Baird, Clayton, Miller
& Vogel
Attys.

INVENTORS
Floyd H. Busch
Fred H. Sawada

Aug. 28, 1962 — F. H. BUSCH ETAL — 3,051,813
TEMPERATURE CONTROL SYSTEMS
Filed Aug. 24, 1960 — 5 Sheets-Sheet 5

INVENTORS
Floyd H. Busch
Fred H. Sawada
BY Prangley, Baird Clayton Miller & Vogel
Attys.

United States Patent Office  3,051,813
Patented Aug. 28, 1962

3,051,813
TEMPERATURE CONTROL SYSTEMS
Floyd H. Busch, Flossmoore, and Fred H. Sawada, Wheaton, Ill., assignors to General Electric Company, a corporation of New York
Filed Aug. 24, 1960, Ser. No. 51,685
19 Claims. (Cl. 219—20)

The present invention relates to electric control systems, and more particularly, to improved automatic temperature control systems for electric heating apparatus, and specifically to such automatic temperature control systems for cooking vessels heated by electric heating units or hotplates and particularly of the character disclosed in U.S. Patent No. 2,822,455 granted on February 4, 1958 to Robert J. Molyneaux and Kenneth H. Walkoe.

It is the general object o fthe present invention to provide an electric control system that comprises a circuit network of simple and economical connection and arrangement involving a minimum number of individual conventional elements.

Another object of the invention is to provide an automatic temperature control system incorporating an improved circuit network that requires no thermionic tubes or other elements which must be replaced during the normal life of the system.

Yet another object of the invention is to provide an electric control system incorporating an improved circuit network that requires no moving parts except the manually adjustable temperature selecting switches.

Still another object of the invention is to provide an automatic electric control system of the character noted including an improved circuit network that regulates the power provided to the associated electric heater as demanded thereby, power being continuously provided to the heater when required and being infinitely variable from the full power input to zero power input upon demand.

A further object of the invention is to provide an automatic temperature control system of the character noted that includes an electronic power switch for selectively controlling the heating of the electric heater, an electric control circuit for selectively controlling the operation of the power switch, a temperature sensing element controlled by the temperature of the medium being heated for selectively controlling the operation of the electronic control circuit, and a solid state controlled rectifier controlled by said power switch and providing the controlled power input to the heating element.

Further features of the invention pertain to the particular arrangement of the elements of the electric heating apparatus and of the associated control network, whereby the above-outlined and additional operating features thereof are attained.

The invention, both as to its organization and method of operation, together with further objects and advantages thereof, will best be understood by reference to the following specification taken in connection with the accompanying drawings, in which:

FIGURE 1 is a fragmentary front perspective view of the upper portion of an electric range incorporating therein electric heating apparatus embodying the present invention;

FIG. 2 is a greatly enlarged fragmentary vertical sectional view of one of the electric heating units or hotplates incorporated in the electric range, taken in the direction of the arrows along the line 2—2 in FIG. 1, illustrating the construction of the temperature sensing unit incorporated therein and forming a part of the electronic control circuit;

FIG. 6 is a circuit diagram, similar to FIG. 4, and illustrating a second embodiment of the control circuit of the present invention wherein gaseous discharge tubes have been substituted for certain of the solid state devices utilized in the circuit of FIG. 4;

Figure 3:
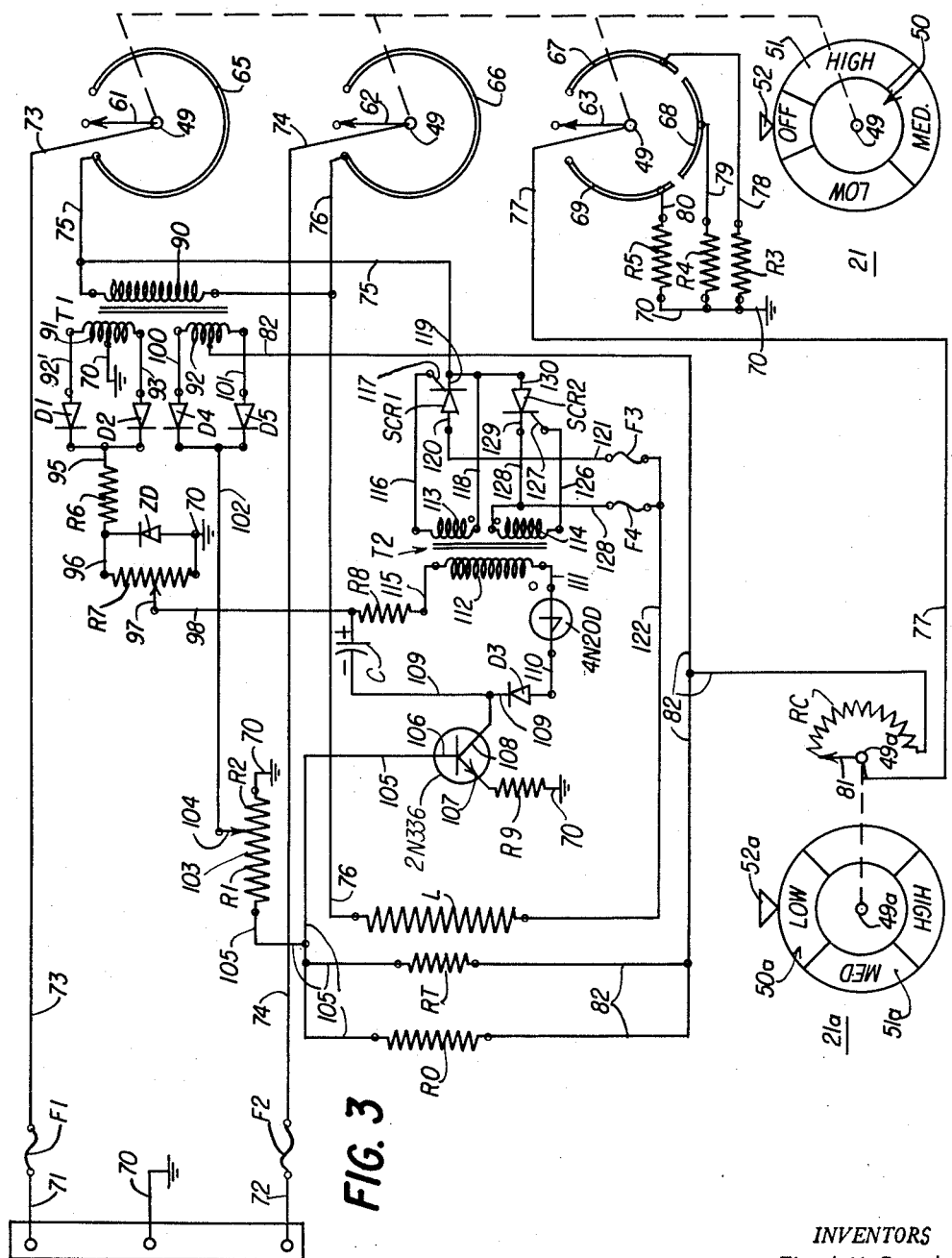
FIG. 3 is a diagram of the electric control circuit for the electric heating unit or hotplate and incorporating the temperature sensing unit shown in FIG. 2 and the improved electric control circuit of the present invention.

Referring now to FIG. 1 of the drawings, there is illustrated an electric range 10 incorporating electric heating apparatus embodying the features of the present invention and comprising an upstanding body 11 provided with a substantially horizontally disposed cooking top 12 supporting a plurality of surface heating units or hotplates 13, 14, 15 and 16 arranged in spaced apart relationship in a substantially rectangular pattern on the left side thereof, the body 11 houses an oven, not shown, in the right-hand portion thereof, and a compartment, not shown, in the left-hand portion thereof, the oven and the compartment being respectively provided with front doors, not shown. The cooking top 12 carries an upstanding backsplash 17 adjacent to the rear thereof, that, in turn carries a plurality of surface heating unit selector switches 18, 19 and 20, a range control switch 21, a temperature selective control switch 21a, an oven selector switch 22, and an oven regulator or thermostat switch 23. The elements 18 to 23, inclusive, being arranged in a row on the right-hand side of the backsplash 17. The selector switches 18, 19 and 20, respectively, correspond to the surface heating units 13, 14 and 15, are of conventional construction and are respectively included in the electric heating circuits thereof; while the control switches 21a and 21 cooperate with each other and correspond to the surface heating unit 16 of special construction and are included in the electric heating circuit thereof. Each of the surface heating unit selector switches 18, 19 and 20 and the oven selector switch 22 as well as the thermostat switch 23 are of conventional construction and arrangement.

The cooking top 12 has a plurality of openings therein that respectively receive the electric heating units 13, etc.; and each of the electric heating units 13, 14 and 15 may be fundamentally of the construction disclosed in U.S. Patent No. 2,565,443, granted on August 21, 1951 to Oliver G. Vogel and Francis E. Kirk; while the surface heating unit 16 is of the special construction disclosed in the previously mentioned Molyneaux and Walkoe patent.

The surface heating unit 16 is of the hotplate type and is mounted for pivotal movements in the associated opening provided in the cooking top 12 by mechanism, not shown, that is preferably of the construction of that disclosed in U.S. Patent No. 2,565,432 granted on August 21, 1951 to Francis E. Kirk. More particularly, referring to FIG. 2, the heating unit 16 comprises a spider 24 carrying a heating element L including respective inner and outer sections La, Lb, only a portion of the inner section La being illustrated. The heating element L is generally in the form of a helical coil or spiral, the turns of which are arranged in radially spaced-apart relation; and preferably, the heating element L is of the metal sheath-helical resistance conductor type disclosed in U.S. Patent No. 1,367,341, granted on February 1, 1921 to Charles C. Abbott. The spider 24 comprises a substantially centrally disposed upstanding ring 26, the coils of the heating element L being selectively staked to the arms of the spider 24 in the general manner disclosed in the Vogel and Kirk patent mentioned. The top surface of the coils of the heating element L are flattened to define a substantially horizontal plane adapted to engage and to support the bottom wall of a cooking vessel, or the like, not shown.

The hotplate 16 carries a temperature sensing unit 27 within the central ring 26 that is adapted to engage the bottom wall of the cooking vessel, or the like, supported upon the heating element L; and more particularly, a pair of opposed depending arms 28 is arranged exteriorly of the central ring 26, and an upstanding tubular heat shield 29 is arranged interiorly of the central ring 26, the arms 28 and the heat shield 29 being retained in place by a special pair of rivets 30. The arms 28 terminate in inwardly directed flanges 31 disposed below the central ring 26 that carry upper and lower substantially cup-shaped housings 32 and 33 formed of lava or the like. The upper housing 32 is arranged in inverted position and constitutes a supporting base, the housings 32 and 33 being retained in place upon the flanges 31, with an asbestos ring 34 clamped therebetween, by removable screws 35 provided with cooperating nuts 36. An upstanding tubular member 37 is slidably mounted in a cooperating opening 38 provided in the top of the base 32, the upper end of the tubular member 37 carrying an insulating ring 39 formed of lava, or the like, and arranged within the heat shield 29 in spaced relationship with respect thereto. The tubular member 37 is retained in place by an arrangement including a surrounding washer 40 and a cooperating lock ring 41 carried on the low end thereof and cooperating with the top of the base 32 adjacent to the opening 38. The ring 39, in turn, carries a depending tubular heat shield 42 of general skirt-like structure that is spaced inwardly with respect to the cooperating heat shield 29, the extreme lower end of the heat shield 42 being outwardly flared, as indicated at 43, so that it covers the top of the base 32. A center cavity 44 is formed in the top of the ring 39 and carries a sensing button 45 formed of aluminum, or the like.

In the arrangement, the heat shields 29 and 42, as well as the tubular member 37 are preferably formed of stainless steel or other bright and reflective material; while the sensing button 45 is formed of aluminum, or the like, as previously noted, so that it constitutes a good heat conductor capable of following closely the temperature of the bottom wall of a cooking vessel, or the like, supported by the heating element L. The tubular member 37, the ring 39, the heat shield 42 and the sensing button 45 are movable as a unit with respect to the base 32, by virtue of an arrangement of the coil spring 46 surrounding the tubular member 37 and disposed between the top of the base 32 and the bottom of the ring 39. More particularly, the coil spring 46 normally biases the parts 37, 39, 42 and 45 upwardly with respect to the base 32; whereby the top surface of the sensing button 45 is normally disposed slightly above the substantially horizontal plane of the flattened top surface of the heating element L. However, when a cooking vessel, or the like, is placed upon the heating element L, the bottom wall thereof engages the top surface of the sensing button 45 moving the elements 37, 39, 42 and 45 downwardly with respect to the base 32 against the bias of the coil spring 46; whereby the top surface of the sensing button 45 is urged into good thermal contact with the bottom wall of the supported cooking vessel by the coil spring 46.

A temperature sensing resistor RT is arranged in a cooperating centrally disposed cavity formed in the lower surface of the supporting button 45. The temperature sensing resistor RT is, of course, movable with the sensing button 45 and is arranged in good heat exchange relation therewith, for a purpose more fully explained hereinafter, the temperature sensing resistor RT being included in an external electric circuit, described more fully hereinafter, the connecting wire elements extending through the tubular elements 37 and through a hole 33a provided in the housing 33. Since the wiring mentioned is subject to rather a high temperature, it is preferably formed of silver, or the like, and is preferably covered with an insulating material capable of withstanding the relatively high temperature mentioned, such, for example, as polytetrafluoroethylene, sold as "Teflon." The sensing resistor is formed of material having a high positive temperature coefficient of resistance, such, for example, as the ceramic-like material consisting of sintered aluminum oxide, and an oxide of magnesium, manganese, titanium, iron, nickel, cobalt, zinc, etc., and known as "Thermistor" material. For example, the RT may have the exceedingly high temperature coefficient of resistance corresponding to a resistance change of about 10 ohms/° C.; whereby the characteristic of the thermistor RT may be as follows:

| Temperature (° C.) | Total resistance (ohms) |
|---|---|
| 25 | 200 |
| 50 | 400 |
| 100 | 1,000 |
| 150 | 1,500 |
| 200 | 2,000 |

Referring now to FIG. 3, the manually operable control switch 21 carried by the backsplash 17 and individually associated with the hotplate 16 comprises a rotatably mounted operating shaft 49 carrying a manual dial or knob 50 on the outer end thereof and provided with indicia 51 cooperating with an index marker 52 carried by the backsplash 17. More particularly, the control switch 21 comprises off, low, medium and high positions that correspond to respective portions of the indicia 51 carried by the manual dial 50 and cooperating with the index marker 52. In the arrangement, the indicia 51 carried by the manual dial 50 correspond to temperatures of the cooking vessel supported by the hotplate 16; whereby the low range may correspond to the temperature range 120°–220° F.; the medium range may correspond to the temperature range 220°–320° F.; and the high range may correspond to the temperature range 320°–420° F. Further, the rotatable shaft 49 of the control switch 21 carries four wipers 61, 62 and 63 that are simultaneously adjusted as the manual knob 50 is rotated. The wipers 61 and 62, respectively, comprise portions of switches respectively including cooperating conducting segments 65 and 66; and the wiper 63 comprises a portion of a switch including three cooperating conducting segments 67, 68 and 69 which are connected to resistors R3, R4 and R5, respectively, which comprise a portion of a resistance bridge, the other terminals of the resistors R3, R4 and R5 all being connected to ground through a conductor 70.

Also the circuit network comprises a three-wire Edison source of power supply of 236 volts, single-phase, A.C. including two outside lines 71 and 72 and a grounded neutral line 70, the outside lines 71 and 72 being respectively connected through fuses F1 and F2 to lines 73 and 74 connected to the wipers 61 and 62. The conducting segments 65 and 66 respectively terminate two conductors 75 and 76; the wiper 63 terminates a conductor 77; and the conducting segments 67, 68 and 69 are connected to the resistors R3, R4 and R5 respectively by conductors 78, 79 and 80. In the arrangement, when the manual dial 50 occupies its off position, the wipers 61, 62 and 63 respectively disengage the cooperating conducting segments 65, 66, 67, 68 and 69. When the manual dial 50 is rotated in the clockwise direction out of its off position about 10° the wipers 61 and 62 respectively engage the conducting segments 65 and 66 and the wiper 63 engages the conducting segment 67 to connect the resistor R3 between the conductors 70 and 77. As the manual dial 50 is rotated further in the clockwise direction from the low range to its medium range, the wipers 61 and 62 remain in engagement with the respective conducting segments 65 and 66 and the wiper 63 moves out of engagement with the conducting segment 67 and into engagement with the conducting segment 68 whereby to place the resistor R4 between the conductors 70 and 77. When the manual dial 50 is rotated further in the clockwise direction into its high range, the wipers 61 and 62 remain in engagement with the respective conducting segments 65 and 66, and the wiper 63 moves from the conducting segment 68 to the conducting segment 69 whereby to place the resistor R5 in circuit between the conductors 70 and 77.

The second manually operable control switch 21a carried by the backsplash 17 and associated with the hotplate 16 comprises a rotatably mounted operating shaft 49a carrying a manual dial or knob 50a on the outer end thereof and provided with indicia 51a cooperating with an index marker 52a carried by the backsplash 17. More particularly, the control switch 21a comprises low, medium and high positions which correspond to respective portions of the indicia 51a carried by the manual dial 50a and cooperating with the index marker 52a. In the arrangement, the indicia 51a carried by the manual dial 50a correspond to temperatures of the cooking vessel supported by the hotplate 16 within each of the principal ranges of the first manually operable control switch 21, whereby the particular temperature desired within the low range setting of the manual dial 50 can be obtained by the adjustment of the manual dial 50a, and correspondingly, the particular temperature within the medium range and the high range as selected by the manual dial 50 can be adjusted by means of the manual dial 50a. Further, the rotatable shaft 49a of the control switch 21a carries a wiper 81 that is adjusted as the manual knob 50a is rotated. The wiper 81 comprises a portion of a resistance bridge including a control resistor RC. One terminal of the resistor RC is open and the other is connected to a conductor 82 which is connected to the center tap of one of the secondary windings of the transformer T1 as will be explained more fully hereinafter.

The circuit network further comprises a main power supply transformer T1 having the usual primary winding 90 and two secondary windings 91 and 92, the primary winding 90 being connected between the conductors 75 and 76 to which the full line voltage is supplied by means of the wipers 61 and 62 contacting the conducting segments 65 and 66. The first secondary winding 91 has a center tap connection which is grounded through the conductor 70 and each of the end terminals of the secondary winding 91 is connected respectively to like poles of silicon diode rectifiers D1 and D2 by means of conductors 92' and 93 respectively, the other like poles of the rectifiers D1 and D2 being connected by a conductor 95 to one terminal of a limiting resistor R6. In a typical operating example, the A.C. input voltage to the primary winding 90 may be 230 volts and the secondary voltage developed across the secondary winding 91 is 60 volts R.M.S. which when applied to the silicon rectifiers D1 and D2 provides a full wave rectified output therefrom. The other terminal of the resistor R6 is connected by a conductor 96 to one terminal of a resistor R7 and to one terminal of a Zener diode ZD which is characterized by conduction when a voltage of a specified magnitude is applied across the terminals thereof, the diode ZD being of the type which becomes highly conductive when a potential of 28 volts is applied between the terminals thereof. The other terminal of the Zener diode ZD is connected through the conductor 70 to ground, whereby the output from the silicon rectifiers D1 and D2 is applied across a voltage divider including the resistors R6 and R7 connected in series to ground, the resistor R7 being shunted by the Zener diode ZD to clip or limit the voltage peaks of the pulsating D.C. voltage thereacross at 28 volts. The resistor R7 is provided with a wiper 97 which is connected to a conductor 98 whereby a portion of the potential developed across the resistor R7 can be applied through the conductor 98 to a charging circuit in a manner and for a purpose which will be described more fully hereinafter.

The second secondary winding 92 of the transformer T1 has the center tap thereof connected to the conductor 82 and the outer terminals thereof are connected respectively by the conductors 100 and 101 to like terminals of silicon diode rectifiers D4 and D5 which have the other like terminals thereof connected by a conductor 102. The secondary winding 92 and the rectifiers D4 and D5 are arranged to provide a full wave rectifier having as an output therefrom a pulsating D.C. voltage of 20 volts between the conductors 82 and 102. The conductor 82 is further connected to one terminal of the resistor RC, to one terminal of the thermistor RT, and to one terminal of an overload protector resistor RO having a resistance of 10 megohms. The other terminals of the thermistor RT and the resistor RO are connected together by a conductor 105 which is also connected to one terminal of a resistor 103 that is composed of two resistor sections R1 and R2, a movable contact 104 being provided to contact the resistor 103 at the junction of the resistor sections R1 and R2. The other terminal of the resistor 103 is connected to ground by means of the conductor 70 and the movable contact 104 is connected to the conductor 102 which is connected to the other terminals of the rectifiers D4 and D5.

The circuit network in addition includes a silicon transistor 2N336 which provides amplification for a control signal in the network and includes the usual base terminal 106, an emitter 107 and a collector 108, the base terminal 106 being connected to the conductor 105, the emitter 107 being connected to one terminal of a resistor R9 having the other terminal thereof grounded through the conductor 70, and the collector 108 being connected to a conductor 109. The conductor 109 is connected to one terminal of a charging capacitor C and the other terminal of the capacitor C is connected to the conductor 98. The conductor 109 is further connected to one input terminal of a silicon diode D3 which has the other input terminal thereof connected by a conductor 110 to one of the input terminals of a Shockley diode 4N20D, the Shockley diode 4N20D being a four layer solid state device including junctions arranged in the order p-n-p-n and characterized by having a high impedance of the order of one million ohms to the passage of current therethrough until a potential of a predetermined value is impressed thereacross and having an impedance of one ohm to the passage of current therethrough upon the application of a potential of the predetermined value and of the proper polarity to the input terminals thereof, the diode 4N20D requiring a potential of 20 volts thereacross to cause heavy conduction therethrough, this being called the "avalanche" voltage thereof. The other input terminal of the Shockley diode 4N20D is connected by a conductor 111 to one of the input terminals of a pulse transformer T2 having an input or primary winding 112 and a pair of secondary windings 113 and 114. The other input terminal for the primary winding 112 is connected by a conductor 115 to one terminal of a limiting resistor R8, the other terminal of the resistor R8 being connected to the conductor 98.

The first secondary winding 113 of the pulse transformer T2 is connected to a first silicon controlled rectifier SCR1 having a gate 117 and a pair of power terminals 119 and 120, the rectifier SCR1 being more particularly a solid state rectifier comprising four rectifying junctions in series, namely, p-n-p-n, with the power terminals 119 and 120 connected to the terminals p and n junctions and with the gate 117 connected to the intermediate p junction. The rectifier SCR1 is characterized by having a high impedance to the flow of current between the terminals 119 and 120 in both directions when no signal is applied to the gate 117 and by having a low impedance between the terminals 119 and 120 when a predetermined pulse is applied to the gate 117. More particularly, one of the terminals of the winding 113 is connected by a conductor 116 to the gate 117 of the rectifier SCR1 and the other terminal of the secondary winding 113 is connected by a conductor 118 to the adjacent power terminal 119 of the rectifier SCR1. The other power terminal 120 of the rectifier SCR1 is connected via a conductor 121 to a fuse F3 which in turn is connected to a conductor 122 connecting with the other terminal of the heating element L. The power terminal 119 of the rectifier SCR1 is further connected to the main input conductor 75, whereby the rectifier SCR1 is connected in circuit with the power source and the heating element L thereby to provide a half-wave rectification of the input power signal upon the application of the proper control signal to the gate 117 thereof. The second secondary winding 114 of the pulse transformer T2 is connected to a second silicon controlled rectifier SCR2 which is identical in construction with the rectifier SCR1 described above and includes a control gate 127 and a pair of power terminals 129 and 130. More specifically, one of the terminals of the winding 114 is connected by a conductor 126 to the gate 127 of the rectifier SCR2 and the other terminal of the secondary winding 114 is connected by a conductor 128 to the adjacent power terminal 129 of the rectifier SCR2. The other power terminal 130 of the rectifier SCR2 is connected to the main input conductor 75 and the power terminal 129 is further connected via the conductor 128 to a fuse F4 which in turn connects with the conductor 122 that is connected to the other terminal of the heating element L whereby to provide half-wave rectification of the input power signal upon the application of the proper control signal to the gate 127 thereof, the output from the second rectifier SCR2 being also applied to the heating element L.

Figure 4:
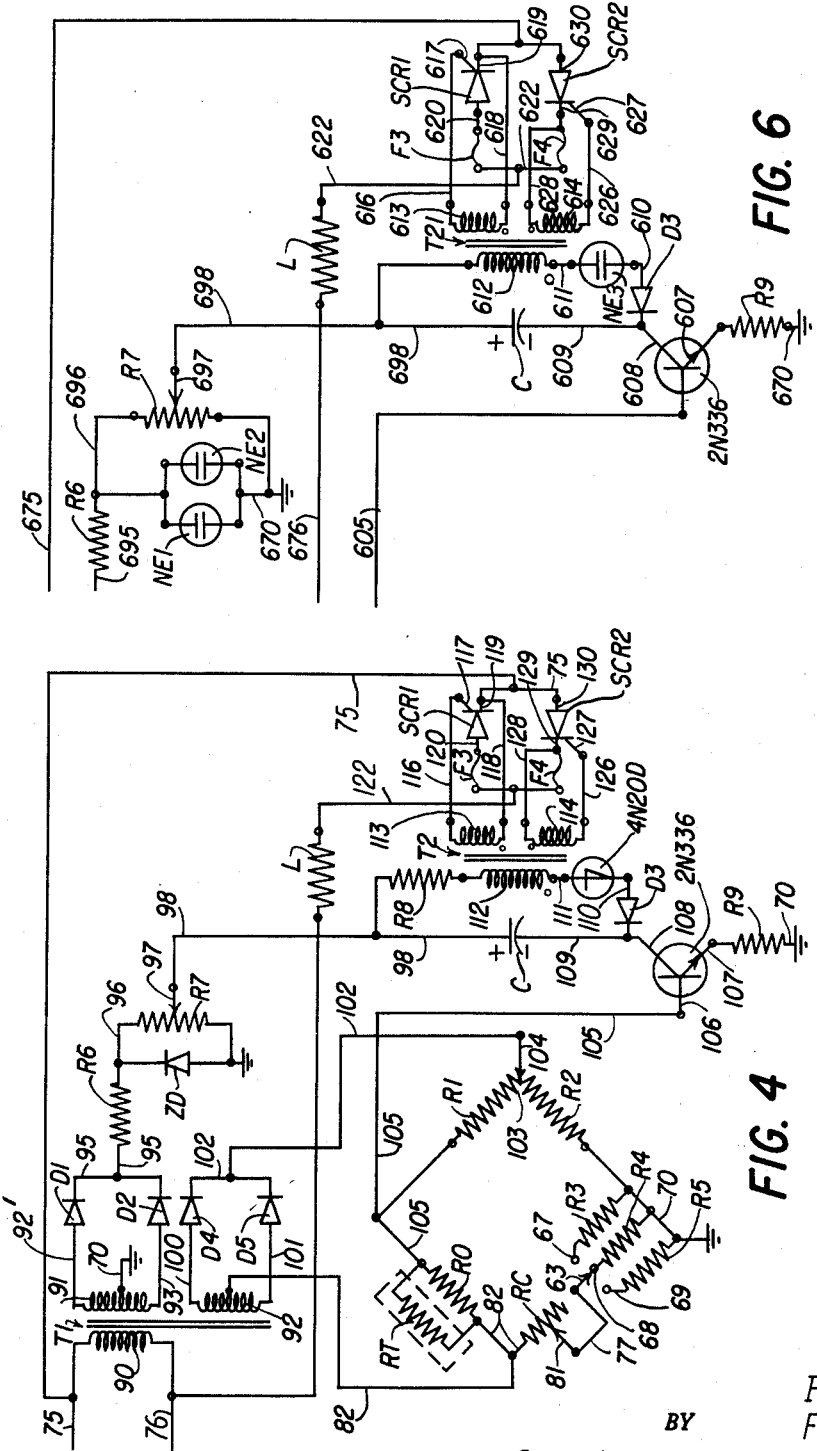
FIG. 4 is a simplified schematic diagram of the electric control circuit illustrated in FIG. 3.

Referring particularly to FIG. 4 of the drawings wherein there is shown a simplified and rearranged schematic drawing of the parts illustrated in FIGS. 1 to 3, the operation of the circuit network and the associated parts will be described in detail. It will be seen from FIG. 4 that the resistors R1, R2, R3, R4, R5, RC, RO and RT form a Wheatstone bridge network in which one leg of the bridge network comprises that portion of the control resistor RC between the wiper 81 and the conductor 82 in series with the selected one of the range resistors R3, R4 and R5; a second leg of the bridge network comprises the temperature sensing resistor RT in parallel with the overload protection resistor RO and connected to the conductors 82 and 105; a third leg of the bridge network comprises that portion of the resistor 103 disposed between the movable contact 104 and the conductor 105 and designated R1; and the fourth leg of the bridge network comprises that portion of the resistor 103 disposed between the movable contact 104 and the conductor 70 and designated R2. The power to operate the bridge network is derived from the full-wave rectifier including the diodes D4 and D5, the input to the bridge network being provided by the conductor 82 connected to the junction of the resistors RC and RT and the conductor 102 connected to the movable contact 104 at the junction of the resistors R1 and R2, the voltage applied to the bridge being a pulsating DC voltage. The common junction of the resistors R2, R3, R4 and R5 is grounded and the output from the bride network appears between the conductors 70 and 105, this output being applied to the silicon transistor 2N336 for amplification.

Figure 5:
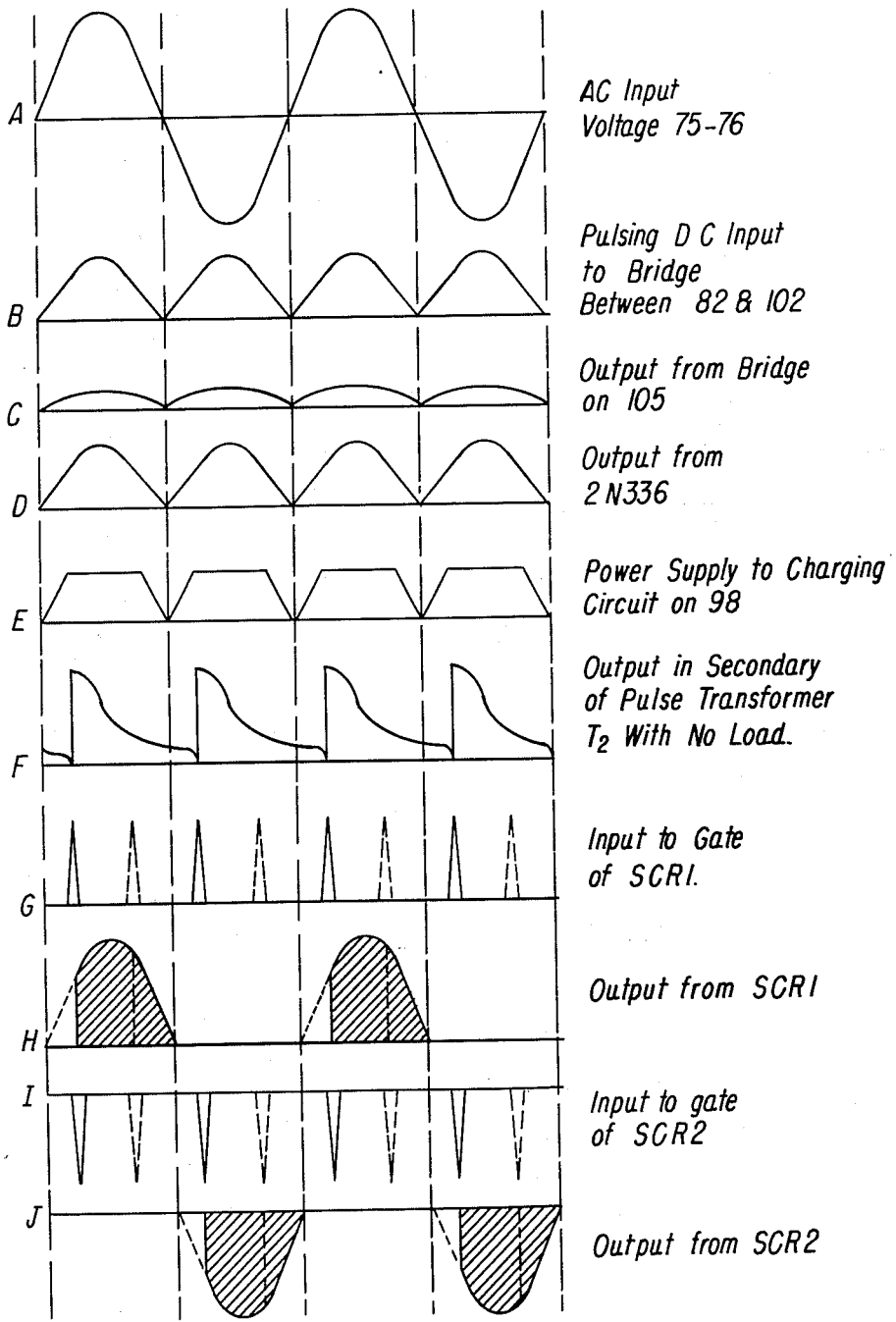
FIG. 5 is a graphic illustration of the voltages obtained at different points of the circuit of FIGS. 3 and 4 during the operation thereof and illustrating particularly the phase relationship among the voltages.

Now assuming that the cook wishes to carry out a medium temperature cooking operation upon the hotplate 16 and that the heating element L thereof is cool, the cook places the cooking vessel and its contents in a supporting position on the top surface of the heating element L, whereby the bottom wall of the cooking vessel engages the sensing button 45 and moves the sensing unit 27 into its depressed position so that the sensing button 45 is in good thermal contact with the bottom of the cooking vessel. At this time, the thermistor RT is cool so that it has the exceedingly low resistance previously noted. Finally, the cook rotates the manual dial 50 in the clockwise direction from its off position to its medium position whereby the wipers 61 and 62 engage the conducting segments 65 and 66, respectively, so as to complete a circuit for operating the various rectifiers D1, D2, D4 and D5 and to effect operation of the control bridge network, the amplifier 2N336, and the charging capacitor C; the cook likewise will adjust the manual dial 50a to determine the particular temperature within the medium range at which the hotplate 16 is to operate. The output of the rectifiers D4 and D5 is applied to a circuit that can be traced from the conductor 82 through two parallel paths to the conductor 102, one of the parallel paths being through the resistors RO and RT in parallel with each other and in series with the resistor R1, the other parallel path being through the resistors RC and R4 in series with each other and with the resistor R2. The resistance values of the various resistors in the bridge network are chosen so that there is no output between the conductors 70 and 105 when the temperature of the thermistor RT is that set by the resistor RC and the selected one of the resistors R3, R4, or R5. At the beginning of the cooking operation when the hotplate 16 is cold, the resistance of the thermistor RT will be substantially less than that required for balance of the bridge and, accordingly, there will be a difference potential generated between the conductors 70 and 105. The greater the difference between the temperature of the thermistor RT and the temperature selected by the cook and determined by the resistors R4 and RC, the greater will be the signal appearing between the conductor 70 and 105; and conversely, the more nearly the temperature of the resistor RT approaches the temperature selected by the cook, the smaller will be the output signal between the conductors 70 and 105 and eventually no output signal will be derived when the temperature of the resistor RT is that set by the cook by the operation of the dials 50 and 50a. The character of the output signal from the bridge appearing between the conductors 70 and 105 can be seen by reference to FIG. 5 of the drawings wherein FIG. 5A illustrates the A.C. input voltage appearing on the conductors 75—76, FIG. 5B illustrates the pulsating D.C. input to the bridge network appearing between the conductors 82 and 102, and FIG. 5C illustrates the output from the bridge network on the conductor 105 when there is an unbalance in the bridge, i.e., the temperature of the thermistor RT is below that set by the cook using the dials 50 and 50a.

The output signal from the bridge network appearing between the conductors 70 and 105 is applied as the input to the transistor 2N336 which is a part of the charging circuit for the capacitor C. More particularly, the charging circuit for the capacitor C can be traced from ground through the conductor 70, through the limiting and biasing resistor R9, to transistor 2N336, to capacitor C, to conductor 98, and to the movable contact 97 against the resistor R7; the potential appearing between the movable contact 97 and the grounded conductor 70 is the potential applied to operate the charging circuit for the capacitor C. The potential between the contact 97 and the conductor 70 in turn is derived from the full-wave rectifier including the diodes D1 and D2, the output therefrom being a full-wave rectified signal in the form of a pulsating D.C. voltage of the same character illustrated in FIG. 5B; that pulsating voltage is applied across a voltage divider network including the resistors R6 and R7 to ground, the resistor R7 being shunted by the Zener diode ZD which conducts when the potential of the pulses across the resistor R7 reaches a predetermined value, for example, 28 volts, whereby to clip or limit the voltage appearing across the resistor R7; consequently, the potential between the movable contact 97 and the conductor 70 appearing on the conductor 98 is a clipped full-wave rectified voltage of the type illustrated in FIG. 5E of the drawings. When the bridge is out of balance so that a signal appears at the input to the transistor 2N336, the transistor constitutes a low impedance in the charging path of the capacitor C and consequently the capacitor C charges rapidly toward the potential appearing on the conductor 98. There is no charging current through the circuit in parallel with the charging capacitor C, namely, the circuit including the blocking diode D3, the Shockley diode 4N20D, the primary winding 112 of the pulse transformer T2 and the limiting resistor R8, because of the presence of the blocking diode D3 which is poled to prevent conduction in a direction that would charge the capacitor C; furthermore, the Shockley diode 4N20D will not conduct in the direction of conduction of the diode D3 until the potential across the capacitor C reaches a predetermined value of 20 volts. Eventually, the charge on the capacitor C reaches 20 volts at which time the impedance of the Shockley diode 4N20D changes from one million ohms to 1 ohm and permits rapid discharge of the capacitor C through the parallel discharge circuit including the limiting resistor R8, the primary winding 112 of the pulse transformer T2, the Shockley diode 4N20D, and the blocking diode D3.

The surge of current through the primary winding 112 of the pulse transformer T2 upon conduction of the Shockley diode 4N20D causes a pulse in the secondary windings 113 and 114 of the character illustrated in FIG. 5F when the secondary windings have no load thereacross. With the secondary windings 113 and 114 connected as illustrated in FIG. 4 of the drawings, the pulses therefrom upon conduction of the Shockley diode 4N20D are of the character illustrated in FIGS. 5G and 5I, respectively, these pulses being applied to the control gates of the rectifiers SCR1 and SCR2, respectively. In the absence of a control pulse on the gates 117 and 127 of the rectifiers SCR1 and SCR2, respectively, these rectifiers are nonconducting and there is no voltage applied to the heating element L and no heating current flows therethrough. Upon application of a suitable control signal such as that illustrated by solid lines in FIG. 5G to the gate of the rectifier SCR1, a path for flow of current through the heating element L is established as follows: From the conductor 75 to the power terminal 119 of the rectifier SCR1, through the rectifier SCR1 to the power terminal 120 thereof, through the fuse F3 and the conductor 122 to one terminal of the heating element L, and through the heating element L to the main conductor 76, it being understood that the full line voltage is applied between the conductors 75 and 76 upon the movement of the switch 21 from the off position to the medium position thereof. Accordingly, a portion of each half cycle of one set of half cycles of the input voltage (the positive half cycles as illustrated in FIG. 5H) is applied to the heating element L, substantially all of each positive half cycle of the input voltage being applied thereto by operation of the rectifier SCR1 when the bridge network is greatly out of balance as is the case when beginning the cooking operation with the hotplate 16 cool, the voltage wave form applied under these conditions being illustrated in FIG. 5H of the drawings. The application of the pulses from the transformer T2 appearing in the secondary winding 114 (illustrated by solid lines in FIG. 5I of the drawings) to the gate 127 of the rectifier SCR2 establishes a circuit from the A.C. input conductor 75 to the power terminal 130 of the rectifier SCR2, through the rectifier SCR2 to the power terminal 129 thereof, through the fuse F4 and the conductor 122 to one input terminal of the heating element L, and through the heating element L to the input voltage conductor 76. Consequently, a portion of each of the other half cycles of the input voltage (the negative half cycles as illustrated in FIG. 5J of the drawings) is applied to the heating element L by the conduction of the rectifier SCR2, the portion of the cycles applied being substantially all when the bridge network is greatly out of balance as will be the condition when beginning a cooking operation with the hotplate 16 cool, the wave form applied to the heating element L being that shown in FIG. 5J of the drawings.

As the heating element L continues to be fed with the power pulses illustrated in FIGS. 5H and 5I of the drawings, the hotplate 16 will become heated thereby to heat the cooking vessel and to heat the sensing button 45 thereby heating the thermistor RT. As the thermistor RT increases in temperature, the resistance thereof increases whereby to place the bridge network more nearly in balance and thus reducing the output signal between the conductors 70 and 105 which is fed as the input to the amplifier transistor 2N336. A reduced signal fed to the transistor 2N336 will increase the impedance thereof and cause the capacitor C to charge at a slower rate and, accordingly, the breakdown or avalanche voltage of 20 volts needed to fire the Shockley diode 4N20D will be reached later, thereby delaying the pulses fed to the control gates of the rectifiers SCR1 and SCR2, the pulses, for example, being those illustrated by dashed lines in FIGS. 5G and 5I. Consequently, a smaller portion of the input voltage power half cycles will be applied by conduction of the rectifiers SCR1 and SCR2 to the heating element L and therefore the heating produced thereby will be decreased. When the temperature of the cooking vessel reaches that selected by the cook by means of the dials 50 and 50a, the sensing button 45 will be heated to that temperature and in turn will heat the thermistor RT to a temperature such that the resistance thereof causes a balance in the bridge network whereby no output signal is derived between the conductors 70 and 105. As a consequence, the impedance of the transistor 2N336 will be so great that the charging capacitor C will never charge to the avalanche voltage for the Shockley diode 4N20D and therefore no pulses are fed to the control gates 117 and 127 of the rectifiers SCR1 and SCR2 and no heating power is applied to the heating element L.

Subsequently, the temperature of the cooking vessel and its contents subsides when no heat is being supplied by the heating element L so that the temperature of the resistor RT is reduced bringing about a decrease of resistance thereof with a subsequent increase in the output from the bridge network on the conductor 105 applied to the amplifier transistor 2N336, this resulting in a reduction of the effective impedance thereof and therefore an increase in the charging rate of the charging capacitor C. The capacitor C will then charge fast enough to fire the Shockley diode 4N20D prior to the end of the input voltage cycles so that a small amount of power will again be applied to the heating element L until the temperature of the cooking vessel is again raised to that selected.

From the above explanation it will be seen that the charging rate of the charging capacitor C is proportional to the unbalance of the bridge network which is in turn a function of the difference between the temperature of the resistor RT as determined by the temperature of the cooking vessel on the hotplate 16 and the temperature selected by the cook by adjustment of the dials 50 and 50a which adjust the resistors R3, R4, R5 and RC. The time at which the Shockley diode 4N20D fires to provide output pulses from the transformer T2 is in turn a function of the charging rate of the charging capacitor C and therefore is a function of the temperature difference between the thermistor RT and the temperature selected by the cook. A large temperature difference results in a large input to the amplifier transistor 2N336 and provides a fast charging time for the capacitor C thus causing early conduction of the Shockley diode 4N20D thereby to produce the pulses illustrated by solid lines in FIGS. 5G and 5I early in the phase of each half cycle of the input voltage. As the temperature of the resistor RT approaches the temperature selected by the cook, the unbalance signal amplifier by the transistor 2N336 becomes smaller, the charging time of the capacitor C becomes longer and the Shockley diode 4N20D fires later in the cycles of the A.C. voltage (for example, the pulses illustrated by dashed lines in FIG. 5F) thereby to apply a lesser portion of the input voltage across the heating element L. When the temperature of the thermistor RT reaches that selected by the cook, there is no output from the bridge network and the capacitor C does not charge to a voltage which will fire the Shockley diode 4N20D and there will be no signal applied to the gates of the rectifiers SCR1 and SCR2 and no portion of the input voltage will be applied to the heating element L. This control system therefore, upon demand for heat as determined by the bridge network, applies a portion of the input voltage across the heating element L on each half cycle of the input voltage, the portion of each half cycle applied to the heating element L varying from all of the half cycle to none thereof, the amount applied being proportional to the temperature difference between the thermistor RT and the temperature set by the cook by means of the dials 50 and 50a. As a result, there is a very smooth and continuous application of power, when demanded, in the form of 120 pulses per second to the heating element L, the amount of power applied being proportional to the power needed; as a consequence, there is no overrun of the selected temperature or overheating of the heating element L and the control of the heating element L is continuously variable and accurate whereby to provide a precise control of the temperature of the cooking vessel.

In view of the above, it will be understood that the carrying out of cooking operations in the high range and the low range upon the hotplate 16 is substantially identical to that described in connection with the medium range cooking operation except that the manual dial 50 is rotated to the positions corresponding to the high range and the low range thereof, whereby correspondingly higher and lower temperatures are set for the operation of the control network. In connection with the operation of the manual dial 50 into its high range, it is noted that the wiper 63 engages the associated conducting segment 69 so as to place the resistor R5 in series with the control resistor RC. Similarly in connection with the operation of the manual dial 50 into its low range, it is noted that the wiper 63 engages the conducting segment 67 so as to place the resistor R3 in series with the resistor RC.

Of course, it will be understood that at the conclusion of any cooking operation, when the manual dial 50 is returned back into its off position, the wipers 61 and 62, respectively disengage the associated conducting segments 65 and 66 effecting deenergization of all of the circuit elements so that the heating element L is disconnected from the three-wire Edison source.

In the operation of the circuit network, it will be appreciated that the resistor RO serves as a fail safe protective device in the event that the thermistor RT becomes disconnected or broken. The resistance of the resistor RO is sufficiently high to provide an output from the network sufficient substantially to cut off the transistor 2N336 and thus to prevent the application of any power to the heating element L. The movable contact 104 on the resistor 103 permits a factory adjustment of the bridge network to insure that the bridge is balanced when the temperature of the thermistor RT is that corresponding to the setting of the resistors R3, R4, R5 and RC. The movable contact 97 associated with the resistor R7 permits the selection by a factory adjustment of the proper operating voltage for the charging network associated with the charging capacitor C. The resistor R8 in the discharge circuit for the capacitor C is a limiting resistor to insure that the current flowing through the discharge circuit is not sufficiently great to injure any of the components therein and particularly the Shockley diode 4N20D. The resistor R9 provides a bias for the transistor 2N336 of approximately 0.4 volt.

There is shown in FIG. 6 of the drawings a second preferred embodiment of the control circuit illustrated in FIG. 4, like designations having been given to like circuit elements and similar numerals having been applied to like elements, for example, the main input voltage supply lines being numbered 675 and 676 in FIG. 6 and corresponding to the conductors 75 and 76 in FIGS. 3 and 4. The output from the rectifiers D1 and D2 appears on the conductor 695 and is applied to ground through the resistors R6 and R7. Two neon bulbs NE1 and NE2 have been provided in parallel circuit with each other shunting the resistor R7 to ground to provide a clipped full-wave pulsating D.C. voltage thereacross of the type illustrated in FIG. 5E of the drawings, the neon bulbs NE1 and NE2 acting in a manner analogous to that of the Zener diode ZD in FIGS. 3 and 4. A portion of the voltage developed across the resistor R7 is taken therefrom by means of the movable contact 697 to be used as the charging potential for a charging circuit including the resistor R9, the transistor 2N336 and the charging capacitor C, the output, if any, from the bridge network being applied to the base of the transistor 2N336 to vary the impedance thereof in the charging circuit for the capacitor C. The discharge circuit for the capacitor C is through the primary 612 of the pulse transformer T2, the conductor 611, the neon bulb NE3, the conductor 610 and a silicon rectifier diode D3 which is poled to permit passage of current only in the discharge direction for the capacitor C thus permitting discharge of the capacitor C. The output from the pulse transformer T2 appears on two secondary windings 613 and 614, the output being applied to the control gates 617 and 627, respectively, of the silicon controlled rectifiers SCR1 and SCR2. The power terminals 619 and 630 are connected to each other and to the main supply conductor 675; and the power terminals 620 and 629 are connected through fuses F3 and F4, respectively, to a conductor 622 connecting with one terminal of the heating element L. The other terminal of the heating element L is connected to the other main supply conductor 676. By this arrangement, the rectifiers SCR1 and SCR2 provide full rectification of the input voltage on the conductors 675—676 upon the application of voltage control signals to the gates 617 and 627 thereof.

The control circuit of FIG. 6 operates substantially in the same manner as the control circuit of FIG. 4, the neon bulbs NE1 and NE2 providing a pulsating D.C. voltage clipped at a predetermined value for application to the charging circuit of the charging capacitor C and the conduction of the neon bulb NE3 providing an output pulse from the discharge circuit when the capacitor C has charged to a predetermined potential, the neon bulb NE3 therefore acting in a manner analogous to that of the Shockley diode 4N20D described above with respect to FIG. 4. The control network of FIG. 6 therefore in combination with the silicon controlled rectifiers SCR1 and SCR2 serves to provide 120 power pulses per second to the heating element L so long as there is any demand for heat therefrom as determined by the thermistor RT in thermal contact with the cooking vessel being heated. The power delivered in each power pulse is proportional to the demand, the conduction of the rectifiers SCR1 and SCR2 being time phase controlled, whereby the rectifiers SCR1 and SCR2 conduct early in the power cycle when there is a large demand for heat, conduct progressively later in the power cycle as the damnd for heat decreases, and eventually conduct not at all if there is no demand for heat from the heating element L. The rectifiers SCR1 and SCR2 automatically cease conducting at the end of each half cycle when the applied potential passes through zero and will not conduct again until a control pulse is provided thereto on the gate thereof. The time phase control is provided by the variable charging time of the capacitor C which is regulated in turn by the unbalance signal from the bridge network amplified through the transistor 2N336. The circuit of FIG. 6 will also provide even and accurate control of the heat produced by the heating element L, the heat produced being proportional to the demand and infinitely variable from full heating to zero heating.

Figures 7, 8:
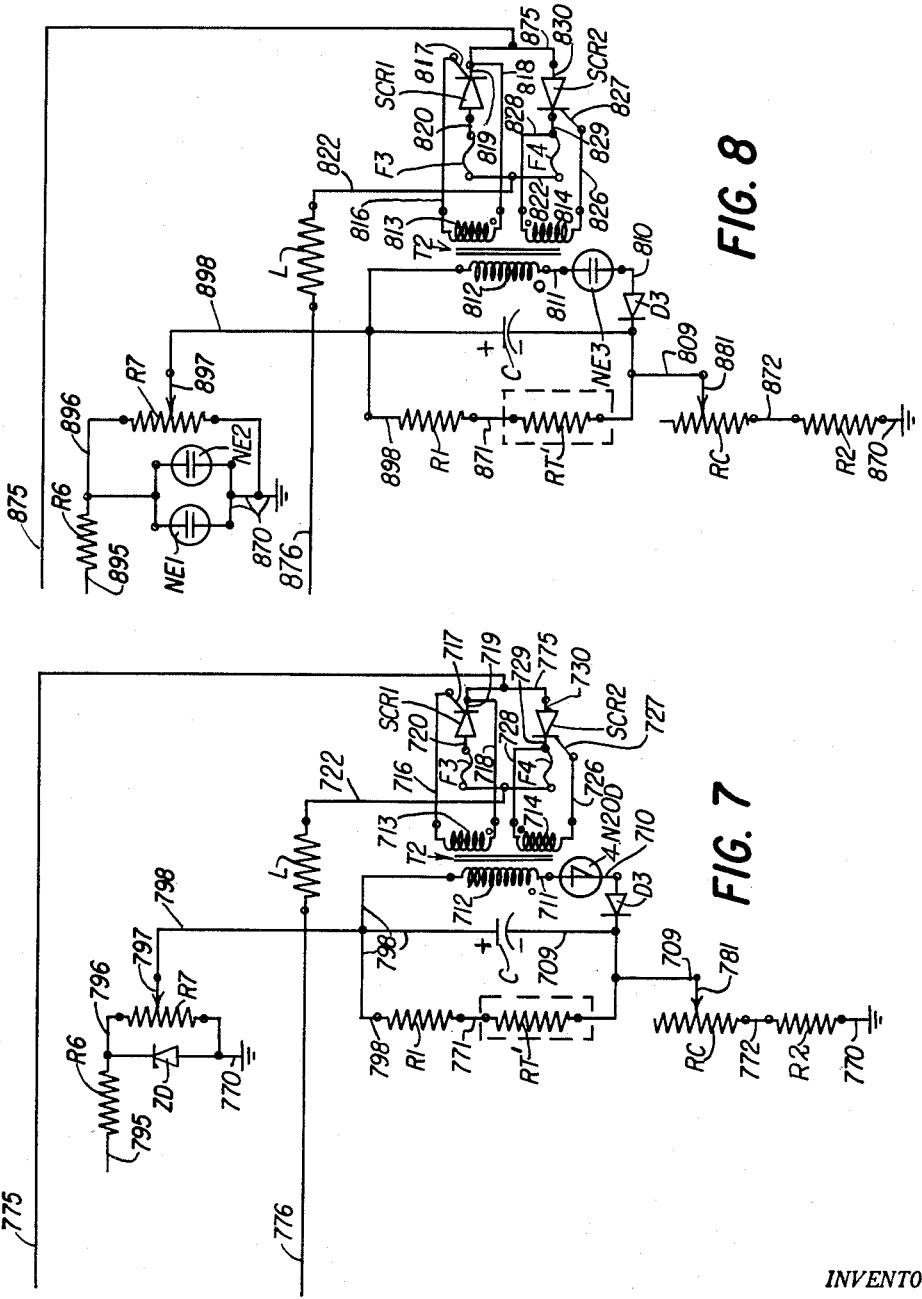
FIG. 7 is a circuit diagram, also similar to FIG. 4, and illustrating a third embodiment of the present invention.
FIG. 8 is a circuit diagram, similar to FIG. 7, and illustrating a fourth embodiment of the present invention.

There is shown in FIG. 7 of the drawings another preferred embodiment of the present invention wherein a simplified circuit is provided to determine when power is demanded for operation of the heating element L. Again like parts have like designations applied thereto and similar numerals have been provided with each number in FIG. 7 beginning with the numeral "7" whereby the main input conductors 775 and 776 in FIG. 7 correspond to the conductors 75 and 76 in FIGS. 3 and 4. The clipped full wave rectified output obtained on the movable contact 797 is applied across a voltage divider network to ground, the voltage divider network comprising the resistor R1 having one terminal thereof connected to the movable contact 797 by the conductor 798, a negative temperature coefficient thermistor RT' having one terminal thereof connected by a conductor 771 to the other terminal of the resistor R1, a conductor 709 connecting the other terminal of the thermistor RT' to a movable contact 781 on the resistor RC, a conductor 772 connected to one terminal of the resistor RC, and the resistor R2 having one terminal thereof connected to the conductor 772 and the other terminal thereof connected through the conductor 770 to ground. For purposes of simplification the resistor RC in FIG. 7 includes all of the resistors R3, R4, R5 and RC illustrated in FIGS. 3 and 4 of the drawings whereby a single manipulation of the corresponding manual dial 50 selects both the range and the point within range in which it is desired to heat a cooking vessel supported by the hotplate 16.

The charging capacitor C is connected in parallel with the resistors R1 and RT' by connecting the terminals of the capacitor C to the conductors 709 and 798. The charging path for the capacitor C is therefore through the resistor R2, through that portion of the resistor RC between the movable contact 781 and the conductor 772 to the movable contact 797 in the voltage source for the charging network. The potential applied across the charging capacitor C is the potential between the conductors 709 and 798 and therefore the voltage drop across the resistors R1 and RT' in series; the resistors R1, RT', RC and R2 provide in effect a voltage divider network and therefore the voltage drop across the resistors R1 and RT in series is a function both of the resistance of the thermistor RT' and the resistance of the manually controllable resistor RC. When the capacitor C charges to a value of 20 volts, the Shockley diode 4N20D begins to conduct rapidly and the capacitor C thereafter discharges through the discharge circuit including the primary 712 of the pulse transformer T2, the Shockley diode 4N20D and the blocking diode D3 which is poled to permit passage of current only in a direction to discharge the capacitor C. The output from the pulse transformer T2 appears on two secondary windings 713 and 714, the output being applied to the control gates 717 and 727, respectively, of the silicon controlled rectifiers SCR1 and SCR2. The power terminals 719 and 730 are connected to each other and to the main supply conductor 775; and the power terminals 720 and 729 are connected through fuses F3 and F4, respectively, to a conductor 722 connecting with one terminal of the heating element L. The other terminal of the heating element L is connected to the other main supply conductor 776. By this arrangement, the rectifiers SCR1 and SCR2 provide full wave rectification of the input voltage on the conductors 775—776 upon the application of voltage control signals to the gates 717 and 727 thereof.

Now assuming that the cook wishes to carry out a medium temperature cooking operation upon the hotplate 16 and that the heating element L thereof is cool, the cook places the cooking vessel and its contents in a supported position on the top surface of the heating element L, whereby the bottom wall of the cooking vessel engages the sensing button 45 and moves the sensing unit 27 into its depressed position so that the sensing button 45 is in good thermal contact with the bottom of the cooking vessel. At this time, the thermistor RT' is cool so that it has the exceedingly high resistance previously noted. Finally, the cook rotates the dial 50 in the clockwise direction from its off position whereby to complete a circuit for operating the various rectifiers and will adjust the resistance of the resistor RC to a value that is substantially less than the resistance of the thermistor RT' in the cold condition. Accordingly, the voltage applied to the voltage divider network including R1, RT', RC and R2 will be divided in a manner such that the major portion thereof appears across the resistors R1 and RT', the resistance values of R1 and R2 being substantially less than that of RT' and RC, so that substantially all of the charging potential available on the conductor 798 is applied across the capacitor C whereby rapidly to charge the capacitor C to the avalanche voltage of the Shockley diode 4N20D causing conduction thereof to produce an output pulse from the pulse transformer T2 at the beginning of each half cycle of the power voltage. The output pulses from the transformer T2 are of the character illustrated by solid lines in FIGS. 5G and 5I and are applied to the control gates 717 and 727 of the rectifiers SCR1 and SCR2, respectively, near the beginning of each voltage half cycle thereby to cause conduction of the rectifiers SCR1 and SCR2 for all or at least a major portion of the power half cycles to supply a large amount of heating power to the heating element L.

As the temperature of the cooking vessel rises, the resistance of the thermistor RT' will gradually decrease whereby the voltage applied to the voltage divider network will be divided in a manner such that a lesser portion thereof appears across the resistors R1 and RT' so that a lesser charging potential is applied across the capacitor C thereby less rapidly to charge the capacitor C to the avalanche voltage of the Shockley diode 4N20D causing conduction thereof to produce an output pulse from the transformer T2 at, for example, the beginning of the latter portion of each half cycle of the power voltage. The output pulses from the transformer T2 may appear at the time phase illustrated by dashed lines in FIGS. 5G and 5I and when applied to the control gates 717 and 727 of the rectifiers SCR1 and SCR2, respectively, cause conduction thereof at the points illustrated by the vertical dashed lines in FIGS. 5H and 5J so that a lesser portion of the power half cycles are supplied to the heating element L. When the temperature of the cooking vessel reaches that selected by the cook, the sensing button 45 will be heated to that temperature and in turn will heat the thermistor RT' to a temperature such that the resisance thereof causes a voltage to be applied across the conductor C that fails to charge the capacitor C to the avalanche voltage of the Shockley diode 4N20D before the end of the corresponding power half cycle. As a consequence no control signals will be applied to the gates 717 and 727 of the silicon controlling rectifiers SCR1 and SCR2, respectively, and no heating power is applied to the heating element L.

Subsequently the temperature of the cooking vessel and its contents subsides when no heat is being applied to the heating element L so that the temperature of the thermistor RT' is reduced bringing about an increase of the resistance thereof with a subsequent increase in the charging potential applied across the capacitor C and thereby to increase the charging rate of the capacitor C so that it will charge fast enough to fire the Shockley diode 4N20D prior to the end of the corresponding power half cycle so that a small amount of power will again be applied to the heating element L until the temperature of the cooking vessel is again raised to that selected.

There is shown in FIG. 8 of the drawings still another preferred embodiment of the control circuit illustrated in FIG. 7, like parts having had like designations applied thereto and similar numerals provided with each numeral in FIG. 8 beginning with the number "8" whereby the main input conductors 875 and 876 in FIG. 7 correspond to the conductors 75 and 76 in FIGS. 3 and 4 and 775 and 776 in FIG. 7. The output from the rectifiers D1 and D2 appears on the conductor 895 and is applied to ground through the resistors R6 and R7. Two neon bulbs NE1 and NE2 have been provided in parallel circuit with each other shunting the resistor R7 to ground to provide a clipped full wave pulsating D.C. voltage thereacross of the type illustrated in FIG. 5E of the drawings. A portion of the voltage developed across the resistor R7 is taken therefrom by means of the movable contact 897 to be used as the charging potential for the charging circuit including the resistors R1, RT', RC and R2, the capacitor C being in parallel with and connected across the resistors R1 and RT'. The discharge circuit for the capacitor C is through the primary winding 812 of the pulse transformer T2, the neon bulb NE3 and the blocking diode D3 which is poled to permit passage of current only in the discharge direction for the capacitor C. The output from the pulse transformer T2 appears on two secondary windings 813 and 814, the output being applied to the control gates 817 and 827, respectively, of the silicon controlled rectifiers SCR1 and SCR2. The power terminals 819 and 830 are connected to each other and to the main supply conductor 875; and the power terminals 820 and 829 are connected through fuses F3 and F4, respectively, to a conductor 822 connected with one terminal of the heating element L. The other terminal of the heating element L is connected to the other main supply conductor 876. By this arrangement the rectifiers SCR1 and SCR2 provide full wave rectification of the input voltage on the conductors 875—876 upon the application of voltage control signals to the gates 817 and 827 thereof.

The control circuit of FIG. 8 operates substantially in the same manner as the control circuit of FIG. 7, the neon bulbs NE1 and NE2 providing a pulsating D.C. voltage clipped at a predetermined value for application to the charging circuit of the charging capacitor C, and the neon bulb NE3 conducting and providing an output pulse from the discharge circuit when the capacitor C has charged to a predetermined potential, the neon bulb NE3 therefore acting in a manner analogous to that of the Shockley diode 4N20D described above with respect to FIG. 7. The control network of FIG. 7 therefore in combination with the silicon controlled rectifiers SCR1 and SCR2 serves to provide 120 power pulses per second to the heating element L so long as there is any demand for heat therefrom as determined by the thermistor RT' in thermal contact with the cooking vessel being heated. The power delivered in each power pulse is proportional to the demand, the conduction of the rectifiers SCR1 and SCR2 being time phase controlled, whereby the rectifiers SCR1 and SCR2 conduct early in the power cycle when there is a large demand for heat, conduct progressively later in the power cycle as the demand for heat decreases, and eventually conduct not at all if there is no demand for heat from the heating element L. The portion of each power pulse delivered to the heating element L is controlled by the variable charging time of the capacitor C which is in turn regulated by the portion of the charging voltage distributed across the resistors R1 and RC in series and applied to the capacitor C, the neon bulb NE3 conducting when the capacitor C reaches a predetermined value which is the breakdown voltage for the neon bulb NE3. The circuit of FIG. 8 will provide even and accurate control of the heat produced by the heating element L, the heat produced being proportional to the demand and infinitely variable from full heating to zero heating.

Accordingly, it is apparent that there has been provided in a heating apparatus of the hotplate type improved circuit networks for selectively establishing within a relatively wide temperature range the cooking temperature of a cooking vessel supported by the hotplate and for selectively controlling the electric power supplied to the hotplate in accordance with the desired cooking temperature thus established so as to maintain the desired cooking temperature of the cooking vessel and its contents during the cooking operation.

While there has been described what is at present considered to be certain preferred embodiments of the invention, it will be understood that various modifications may be made therein, and it is intended to cover in the appended claims all such modifications that fall within the true spirit and scope of the invention.

What is claimed is:

1. In an alternating current electric heating system including an electric heater, a temperature sensing unit arranged to sense the temperature of a medium heated by said heater, a manually operable controller selectively operative to set different desired temperatures of the medium heated by said heater, and a source of alternating electric power; the combination comprising a solid state controlled rectifier having a pair of power terminals and a control terminal and characterized by conduction between the power terminals thereof during some portion of each alternating current cycle in response to the application of a control signal to the control terminal thereof, means connecting the power terminals of said solid state controlled rectifier and said heater to said source of electric power so that the power supplied to said heater is dependent upon the state of conduction of said solid state controlled rectifier and flows through said rectifier, a control circuit jointly governed by said temperature sensing units and said controller and operative to produce a control signal in response to a difference between the temperature sensed by said temperature sensing unit and the temperature setting of said controller, and means for impressing the control signal produced by said control circuit upon the control terminal of said solid state controlled rectifier so as selectively to govern the conduction between the power terminals thereof and consequently the power supplied to said heater.

2. In an electric heating system comprising an electric heater, a temperature sensing unit arranged to sense the temperature of a medium heated by said heater, a manually operable controller selectively operative to set different desired temperatures of the medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier and flows through said rectifier, a control circuit operated from said power source and jointly governed by said temperature sensing unit and said controller and operative to produce control signals having a predetermined time phase relationship to the corresponding half cycles of said power source in response to a difference between the temperature sensed by said temperature sensing unit and the temperature setting of said controller, and means for impressing the control signals produced by said control circuit upon the control terminal of said solid state controlled rectifier so as selectively to govern the conduction between the power terminals thereof for the time intervals between the application of the control signals to the control terminal and the end of the corresponding half cycles of the power source thereby to govern the power supplied to said heater.

3. In an electric heating system comprising an electric heater, a temperature sensing unit arranged to sense the temperature of a medium heated by said heater, a manually operable controller selectively operative to set different desired temperatures of the medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a time delay circuit operated from said power source and jointly governed by said temperature sensing unit and said controller and operative to produce first control signals having a predetermined time phase delay with respect to the corresponding half cycles of said power source that is inversely proportional to the difference between the temperature sensed by said temperature sensing unit and the temperature setting of said controller, a signal generating circuit operated by said time delay circuit and operative upon the application of the first control signals thereto to produce second control signals having a predetermined time phase delay with respect to the corresponding half cycles of said power source, and means for impressing the second control signals produced by said signal generating circuit upon the control terminal of said solid state controlled rectifier so as selectively to govern the conduction between the power terminals thereof for the time intervals between the application of the control signals to the control terminal and the end of the corresponding half cycles of said power source thereby to govern the power supplied to said heater.

4. In an electric heating system comprising an electric heater, a temperature sensing unit arranged to sense the temperature of a medium heated by said heater, a manually operable controller selectively operative to set different desired temperatures of the medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a capacitor charging circuit including a charging capacitor and operated from said power source and having the charging rate thereof jointly governed by said temperature sensing unit and said controller and operative to charge said capacitor toward a predetermined potential at a rate that is proportional to the difference between the temperature sensed by said temperature sensing unit and the temperature setting of said controller, a discharge circuit for said capacitor including a breakdown device characterized by conduction therethrough in response to the application of the predetermined potential thereacross from said capacitor and operative upon conduction thereof to produce control signals having a predetermined time phase delay with respect to the corresponding half cycles of the power source that is inversely proportional to the difference between the temperature sensed by said temperature sensing unit and the temperature setting of said controller, and means for impressing the control signals produced by said discharge circuit upon the control terminal of said solid state controlled rectifier so as selectively to govern the conduction between the power terminals thereof for the time intervals between the application of the control signals to the control terminal and the end of the corresponding half cycles of said power source thereby to govern the power supplied to said heater.

5. In an electric heating system comprising an electric heater, a temperature sensing unit arranged to sense the temperature of a medium heated by said heater, a manually operable controller selectively operative to set different desired temperatures of the medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a capacitor charging circuit including a charging capacitor and having the charging rate thereof jointly governed by said temperature sensing unit and said controller, a source of pulsating D.C. voltage clipped to provide a constant maximum amplitude thereof connected as the charging potential for said charging circuit to cause said charging capacitor to charge toward a predetermined potential at a rate that is proportional to the difference between the temperature sensed by said temperature sensing unit and the temperature setting of said controller, a discharge circuit for said capacitor including a breakdown device characterized by conduction therethrough in response to the application of the predetermined potential thereacross from said capacitor and a rectifier poled to permit conduction through said discharge circuit only in a direction to discharge said capacitor and operative upon conduction thereof to produce control signals having a predetermined time phase delay with respect to the corresponding half cycles of the power source inversely proportional to the difference between the temperature sensed by said temperature sensing unit and the temperature setting of said control, and means for impressing the control signal produced by said discharge circuit upon the control terminal of said solid state controlled rectifier so as selectively to govern the conduction between the power terminals thereof for the time intervals between the application of the control signals to the control terminal and the end of the corresponding half cycles of said power source thereby to govern the power supplied to said heater.

6. The electric heating system combination set forth in claim 5, wherein the source of the pulsating D.C. voltage includes a resistor shunted by a Zener diode, and the breakdown device is a Shockley diode.

7. The electric heating system combination set forth in claim 5, wherein the source of the pulsating D.C. voltage includes a resistor shunted by a first gaseous discharge tube and the breakdown device is a second gaseous discharge tube.

8. The electric heating system combination set forth in claim 5, wherein the means for impressing the control signals upon the control terminal of the solid state control rectifier is a pulse transformer including a primary winding and a secondary winding and having the primary winding thereof connected in the discharge circuit for said capacitor and having the secondary winding thereof connected to the control terminal of said solid state controlled rectifier.

9. In an electric heating system comprising an electric heater, a temperature sensing unit arranged to sense the temperature of a medium heated by said heater, a manually operable controller selectively operative to set different desired temperatures of the medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a capacitor charging circuit including a charging capacitor and a variable impedance in said charging path jointly governed by said temperature sensing unit and said controller and operative to vary said variable impedance inversely proportional to the difference between the temperature sensed by said temperature sensing unit and the temperature setting of said controller, a source of pulsating D.C. potential clipped to provide a constant maximum amplitude therefor and connected as the charging potential for said charging circuit, a discharge circuit for said capacitor including a breakdown device characterized by conduction therethrough in response to the application of a predetermined potential thereacross from said capacitor and operative upon conduction thereof to produce control signals having a predetermined time phase delay with respect to the corresponding half cycles of said power source that is inversely proportional to the difference between the temperature sensed by said temperature sensing unit and the temperature setting of said controller, and means for impressing the control signal produced by said discharge circuit upon the control terminal of said solid state controlled rectifier so as selectively to govern the conduction between the power terminals thereof for the time intervals between the application of the control signals to the control terminal and the end of the corresponding half cycles of said power source thereby to govern the power supplied to said heater.

10. In an electric heating system comprising an electric heater, a temperature sensing unit arranged to sense the temperature of a medium heated by said heater, a manually operable controller selectively operative to set different desired temperatures of the medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a capacitor charging circuit operated from said power source and including a charging capacitor and a variable impedance device therein, a temperature sensing network including said temperature sensing unit and said controller and operative to produce first control signals therefrom proportional to the difference between the temperature sensed by said temperature sensing unit and the temperature setting of said controller, means operated by said temperature sensing nework for amplifying the first control signals received therefrom and having the output thereof applied to said variable impedance device to control the impedance thereof inversely proportional to the amplitude of the amplified first control signals, a discharge circuit for said capacitor including a breakdown device characterized by conduction therethrough in response to the application of a predetermined potential thereacross from said capacitor and operative upon conduction thereof to produce second control signals having a predetermined time phase delay with respect to the corresponding half cycles of said power source that is inversely proportional to the difference between the temperature sensed by said temperature sensing unit and the temperature setting of said controller, and means for impressing the control signal produced by said discharge circuit upon the control terminal of said solid state controlled rectifier so as selectively to govern the conduction between the power terminals thereof for the time intervals between the application of the control signals to the control terminal and the end of the corresponding half cycles of said power source thereby to govern the power supplied to said heater.

11. The electric heating system combination set forth in claim 10, wherein said temperature sensing unit includes a resistor consisting essentially of a thermistor having a relatively high resistance when the temperature sensed thereby is relatively low and having a relatively low resistance when the temperature sensed thereby is relatively high.

12. The electric heating system combination set forth in claim 10, wherein said temperature sensing unit and said manually operable controller are portions of a Wheatstone bridge network, and said amplifier means is disposed in the capacitor charging circuit and also serves as said variable impedance device.

13. In an electric heating system comprising an electric heater, a temperature sensing unit arranged to sense the temperature of a medium heated by said heater, a manually operable controller selectively operative to set different desired temperatures of the medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a capacitor charging circuit operated from said power source and including a charging capacitor having a charging potential applied thereacross jointly governed by said temperature sensing unit and said controller and operative to charge said capacitor toward a predetermined potential at a rate that is proportional to the difference between the temperature sensed by said temperature sensing unit and the temperature setting of said controller, a discharge circuit for said capacitor including a breakdown device characterized by conduction therethrough in response to the application of a predetermined potential thereacross from said capacitor and operative upon conduction thereof to produce control signals having a predetermined time phase delay with respect to the corresponding half cycles of said power source that is inversely proportional to the difference between the temperature sensed by said temperature sensing unit and the temperature setting of said controller, and means for impressing the control signals produced by said discharge circuit upon the control terminal of said solid state controlled rectifier so as selectively to govern the conduction between the power terminals thereof for the time intervals between the application of the control signals to the control terminal and the end of the corresponding half cycles of said power source thereby to govern the power supplied to said heater.

14. In an electric heating system comprising an electric heater, a temperature sensing resistor operatively associated with the medium heated by said heater and having a high temperature coefficient of resistance so that the resistance of said temperature sensing resistor is selectively variable in accordance with the temperature of the medium heated, a variable resistor controlled by a manually operable controller selectively operative to set different desired temperatures of the medium heated by said heater, and a source of alternating electric power; the combination comprising a solid state controlled rectifier having a pair of power terminals and a control terminal and characterized by conduction between the power terminals thereof in response to the application of a control signal to the control terminal thereof, means connecting the power terminals of said solid state controlled rectifier and said heater to said source of electric power so that the power supplied to said heater is dependent upon the state of conduction of said solid state controlled rectifier, a voltage divider network operated from said power source and including said temperature sensing resistor and said variable resistor in series, a charging capacitor operated by a portion of said voltage divider network including said temperature sensing resistor for charging said capacitor at a rate that is proportional to the difference between the temperature sensed by said temperature sensing resistor and the temperature setting of said variable capacitor, a discharge circuit for said capacitor including a breakdown device characterized by conduction therethrough in response to the application of a predetermined potential thereacross from said capacitor and operative upon conduction thereof to produce control signals having a predetermined time phase delay with respect to the corresponding half cycles of said power source that is inversely proportional to the difference between the temperature sensed by said temperature sensing unit and the temperature setting of said controller, and means for impressing the control signals produced by said discharge circuit upon the control terminal of said solid state controlled rectifier so as selectively to govern the conduction between the power terminals thereof for the time intervals between the application of the control signals to the control terminal and the end of the corresponding half cycles of said power source thereby to govern the power supplied to said heater.

15. In an electric heating system including an electric heater, a temperature sensing unit arranged to sense the temperature of a medium heated by said heater, a manually operable controller selectively operative to set different desired temperatures of the medium heated by said heater, and a source of alternating electric power; the combination comprising two solid state controlled rectifiers each having a pair of power terminals and a control terminal and characterized by conduction between the power terminals thereof in response to the application of a control signal to the control terminal thereof, means connecting the power terminals of said solid state controlled rectifiers and said heater to said source of electric power so that one of said rectifiers conducts during one set of half cycles of said power source upon the application of the control signal to the control terminal thereof and the other of said rectifiers conducts during the other set of half cycles of the power source upon application of the control signal to the control terminal thereof so that the power supplied to said heater is dependent upon the state of conduction of said solid state controlled rectifiers and flows through said rectifiers, a control circuit operated from said power source and jointly governed by said temperature sensing unit and said controller and operative to produce control signals having a predetermined time phase relationship to the corresponding half cycles of said power source in response to a difference between the temperature sensed by said temperature sensing unit and the temperature setting of said controller, and means for impressing the control signals produced by said control circuit upon the control terminals of said solid state controlled rectifiers so as selectively to govern the conduction between the power terminals of said one rectifier during the one set of half cycles of said power source for the time intervals between the application of the control signals to the control terminal thereof and the end of the one set of half cycles of said power source and to govern the conduction between the power terminals of said other rectifier during the other set of half cycles of said power source for the time intervals between the application of the control signals to the control terminal thereof and the end of the other set of half cycles of said power source thereby to govern the power supplied to said heater.

16. In an electric heating system including an electric heater, a temperature sensing unit arranged to sense the temperature of a medium heated by said heater, a manually operable controller selectively operative to set different desired temperatures of the medium heated by said heater, and a source of alternating electric power; the combination comprising two solid state controlled rectifiers each having a pair of power terminals and a control terminal and characterized by conduction between the power terminals thereof in response to the application of a control signal to the control terminal thereof, means connecting the power terminals of said solid state controlled rectifiers and said heater to said source of electric power so that one of said rectifiers conducts during one set of half cycles of said power source upon the application of the control signal to the control terminal thereof and the other of said rectifiers conducts during the other set of half cycles of the power source upon application of the control signal to the control terminal thereof so that the power supplied to said heater is dependent upon the state of conduction of said solid state controlled rectifiers, a time delay circuit operated from said power source and jointly governed by said temperature sensing unit and said controller and operative to produce first control signals having a predetermined time phase delay with respect to the corresponding half cycles of the power source that is inversely proportional to the difference between the temperature sensed by said temperature sensing unit and the temperature setting of said controller, a signal generating circuit operated by said time delay circuit and operative upon the application of the first control signals thereto to produce second control signals having a predetermined time phase delay with respect to the corresponding half cycles of the power source, and means for impressing the second control signals produced by said signal generating circuit upon the control terminals of said solid state controlled rectifiers so as selectively to govern the conduction between the power terminals of said one rectifier during the one set of half cycles of said power source for the time intervals between the application of the second control signals to the control terminal thereof and the end of the one set of half cycles of said power source and to govern the conduction between the power terminals of said other rectifier during the other set of half cycles of said power source for the time intervals between the application of the second control signals to the control terminal thereof and the end of the other set of half cycles of said power source thereby to govern the power supplied to said heater.

17. In an electric heating system including an electric heater, a temperature sensing unit arranged to sense the temperature of a medium heated by said heater, a manually operable controller selectively operative to set different desired temperatures of the medium heated by said heater, and a source of alternating electric power; the combination comprising two solid state controlled rectifiers each having a pair of power terminals and a control terminal and characterized by conduction between the power terminals thereof in response to the application of a control signal to the control terminal thereof, means connecting the power terminals of said solid state controlled rectifiers and said heater to said source of electric power so that one of said rectifiers conducts during one set of half cycles of said power source upon the application of the control signal to the control terminal thereof and the other of said rectifiers conducts during the other set of half cycles of the power source upon application of the control signal to the control terminal thereof so that the power supplied to said heater is dependent upon the state of conduction of said solid state controlled rectifiers, a capacitor charging circuit including a charging capacitor and operated from said power source and having the charging rate thereof jointly governed by said temperature sensing unit and said controller and operative to charge said capacitor toward a predetermined potential at a rate that is proportional to the difference between the temperature sensed by said temperature sensing unit and the temperature setting of said controller, a discharge circuit for said capacitor including a breakdown device characterized by conduction therethrough in response to the application of the predetermined potential thereacross from said capacitor and operative upon conduction thereof to produce control signals having a predetermined time phase delay with respect to the corresponding half cycles of said power source that is inversely proportional to the difference between the temperature sensed by said temperature sensing unit and the temperature setting of said controller, and means for impressing the control signals produced by said discharge circuit upon the control terminals of said solid state controlled rectifiers so as selectively to govern the conduction between the power terminals of said one rectifier during the one set of half cycles of said power source for the time intervals between the application of the control signals to the control terminal thereof and the end of the one set of half cycles of said power source and to govern the conduction between the power terminals of said other rectifier during the other set of half cycles of said power source for the time intervals between the application of the control signals to the control terminal thereof and the end of the other set of half cycles of said power source thereby to govern the power supplied to said heater.

18. In an electric heating system including an electric heater, a temperature sensing unit arranged to sense the temperature of a medium heated by said heater, a manually operable controller selectively operative to set different desired temperatures of the medium heated by said heater, and a source of alternating electric power; the combination comprising two solid state controlled rectifiers each having a pair of power terminals and a control terminal and characterized by conduction between the power terminals thereof in response to the application of a control signal to the control terminal thereof, means connecting the power terminals of said solid state controlled rectifiers and said heater to said source of electric power so that one of said rectifiers conducts during one set of half cycles of said power source upon the application of the control signal to the control terminal thereof and the other of said rectifiers conducts during the other set of half cycles of the power source upon application of the control signal to the control terminal thereof so that the power supplied to said heater is dependent upon the state of conduction of said solid state controlled rectifiers, a capacitor charging circuit including a charging capacitor and having the charging rate thereof jointly governed by said temperature sensing unit and said controller, a source of pulsating D.C. voltage clipped to provide a constant maximum amplitude thereof applied as the charging potential for said charging circuit to cause said charging capacitor to charge toward a predetermined potential at a rate that is proportional to the difference between the temperature sensed by said temperature sensing unit and the temperature setting of said controller, a discharge circuit for said capacitor including a breakdown device characterized by conduction therethrough in response to the application of the predetermined potential thereacross from said capacitor and a rectifier poled to permit conduction through said discharge circuit only in a direction to discharge said capacitor and operative upon conduction thereof to produce control signals having a predetermined time phase delay with respect to the corresponding half cycles of said power source and inversely proportional to the difference between the temperature sensed by said temperature sensing unit and the temperature setting of said controller, and means for impressing the control signals produced by said discharge circuit upon the control terminals of said solid state controlled rectifiers so as selectively to govern the conduction between the power terminals of said one rectifier during the one set of half cycles of said power source for the time intervals between the application of the control signals to the control terminal thereof and the end of the one set of half cycles of said power source and to govern the conduction between the power terminals of said other rectifier during the other set of half cycles of said power source for the time intervals between the application of the control signals to the control terminal thereof and the end of the other set of half cycles of said power source thereby to govern the power supplied to said heater.

19. The electric heating system combination set forth in claim 18, wherein the means for impressing the control signals upon the control terminals of the solid state controlled rectifiers is a pulse transformer including a primary winding and two secondary windings and having the primary winding thereof connected in said discharge circuit for said capacitor and having the secondary windings thereof connected respectively to the control terminals of said solid state controlled rectifiers.

References Cited in the file of this patent

UNITED STATES PATENTS

| | | |
|---|---|---|
| 2,947,915 | Patchell | Aug. 2, 1960 |
| 2,957,111 | Schaeve et al. | Oct. 18, 1960 |
| 2,958,008 | Bray et al. | Oct. 25, 1960 |
| 2,967,924 | Friend | Jan. 10, 1961 |
| 2,994,759 | Lipman | Aug. 1, 1961 |